United States Patent [19]

Banton et al.

[11] Patent Number: 4,633,461

[45] Date of Patent: Dec. 30, 1986

[54] SWITCHING CONTROL FOR MULTIPLE STAGE TIME DIVISION SWITCH

[75] Inventors: Randall G. Banton, Red Bank; Rajiv Bhatia, Marlboro; Donald B. Grust, Sea Bright; David R. Johnson, Point Pleasant; Joseph G. Kneuer, Fair Haven; Kuang-Shin Lin, Aberdeen; Henry S. McDonald, Summit, all of N.J.; David A. Poppe, New Brighton, Minn.; Jeffrey W. Reedy, Durham, N.C.; Richard T. Wurth, Ocean, N.J.

[73] Assignees: AT&T Information Systems Inc.; Bell Telephone Laboratories, Incorporated, both of Holmdel, N.J.

[21] Appl. No.: 752,672

[22] Filed: Jul. 8, 1985

[51] Int. Cl.[4] .......................................... H04Q 11/04
[52] U.S. Cl. ................................... 370/58; 370/110.1
[58] Field of Search ..................... 370/58, 67, 63, 64, 370/110.1

[56] References Cited

U.S. PATENT DOCUMENTS

| | | | |
|---|---|---|---|
| 3,991,276 | 11/1976 | Regnier et al. | 370/63 |
| 4,074,072 | 2/1978 | Christensen et al. | 370/65 |
| 4,317,193 | 2/1982 | Joel | 370/58 |
| 4,484,323 | 11/1984 | Beuscher et al. | 370/58 |
| 4,495,614 | 1/1985 | Aro et al. | 370/58 |

Primary Examiner—Douglas W. Olms
Attorney, Agent, or Firm—Roy C. Lipton; Ronald D. Slusky

[57] ABSTRACT

A multi-stage time division switch interconnects processors communicating over one or more channels on time division lines. One of the processors is designated as a common processor to provide the switching "mapping" information for the various stages of the switch sending the switching information to the memory and logic of each switched stage over dedicated channels which include channels on the time division line emanating from the common processor and time division channels which pass through several switches until the memory of the applicable switch is accessed.

5 Claims, 13 Drawing Figures

POLLING CYCLE

ICA MEMORY BUS

ICA MEMORY BUS

ICA MEMORY BUS

SWITCHING CONTROL FOR MULTIPLE STAGE TIME DIVISION SWITCH

CROSS-REFERENCE TO RELATED APPLICATION

This application is related to the following application filed concurrently herewith and assigned to the assignees of the present application: the application of R. Bhatia, J. G. Kneuer, K-S. Lin, H. S. McDonald, entitled "Time Slot Polling Arrangement for Multiple Stage Time Division Switch".

1. Field of the Invention

This invention relates to common control multiple stage time division switching systems and, more particularly, to arrangements providing common control for the multiple stages of time division switches.

2. Description of the Prior Art

Multistage time division switching systems are known for handling (interconnecting) large numbers of time division channels. A common switching system of this type is the time-space-time network that comprises a space switch intermediate two time division switches. Such networks have the capability to interconnect time division channels on a plurality of time division lines by successively time switching (time slot interchanging), space switching (switching from line to line) and again time switching the channel signals.

In a typical arrangement, the plurality of time division lines extend from the time division switch stages. Each time division line accommodates a plurality of signalling channels and each channel occupies an assigned time slot interval in recurring frames of time slots. A plurality of terminating circuits which function as sending and receiving circuits are connected to each of the time division lines and are individually arranged to exchange signals over a channel by sending and/or receiving such signals during the time slot in each frame allocated to the channel.

Signals applied by the sending terminating circuit to the time division line in the time division channel (that is in the allocated time slot) are passed first to the time division switch in the time-space-time-network switch. The time division switch shifts (time slot interchanges) the signals to another (internal) time slot for interchange within the switching network. The signals in the internal time slot are passed to the space switch which switches the signal to a corresponding internal time slot on an internal path extending to the time division switch connected with that time division line extending to the terminating circuit at the other end of the call or connection. The latter time division switch switches the signal from the internal time slot to the time slot corresponding to the channel allocated to the other terminating circuit and applies the signal to the time division line in this allocated time slot. The switching network thus establishes a connection or "call" between the two terminating circuit and the two terminating circuits are enabled to communicate by way of the channel connected established through the network switch, each terminating circuit interchanging data with the associated time division line within a time slot assigned to the channel for each of such time division lines.

When a new call is to be established, that is when a new channel is to be set up to interconnect a different pair of terminating circuits, the switching network assigns available time slots (or channels) on each of the time division lines extending to the pair of terminating circuits and, in addition, establishes switching functions for the involved switching stages to interconnect the channels on the pair of time division lines. More specifically, each involved time division switch is arranged to time slot interchange the signals on the channels of the time division line to a common time slot on paths extending to the space switch and the space switch is arranged to interchange the signals on such internal time slots on the lines extending to the time division switches.

The function of controlling each of the switches is provided by internal switch controllers. These switch controllers are responsive to external switching instructions which switching instructions define the specific channel interconnections. It is known in the prior art to utilize a common control processor to generate the switch instructions for the controllers for the various switch stages. When a new call is initiated the calling end will request a connection to a terminating end sending the request by way of a "control" channel allocated to the calling end terminating circuit. Typically, the common control processor is connected to all of the time division switches so that this request can be passed to the common control processor. The common control processor in turn, calculates the appropriate channel interconnections to affect the completion of the call and generate switch instructions that are passed to the controllers of all of the involved stages.

Since the common control processor function is essential to the operation of the entire system, it is important that provisions be made in the event that the common control processor should have problems in functioning. One solution is to provide a redundant common control processor. This involves, however, substantial changes in internal network connections and the provision of a second processor which, under normal conditions, provides no functioning. In addition, if there is network migration, that is, if over a period of time the locations of the various switches must be physically changed, the location and/or interconnection of the common processor must be correspondingly changed.

Accordingly, it is the principle object of this invention to provide relocation of the common control processor. More specifically, it is an object of this invention to relocate the common control processor without requiring extensive physical changes in the switch network.

SUMMARY OF THE INVENTION

To achieve the objects of the present invention, the common control processor is arranged to exchange the switch control data by way of one of the terminating circuits with one or more defined channels assigned thereto on the bus path interconnecting the terminating circuit and the associated time division switch stage. The defined channel is interconnected with other channels by the switch stages to apply the switch control data to the switch controllers of the several stages. The common control processor can thereby be physically relocated and arranged to exchange switch control data by way of other terminating circuits interconnected with the time division switch stage by reassigning a defined channel(s) to the other terminating circuit and placing the reassigned defined channel on a new interconnecting path, if appropriate. Such relocation requires only relatively simple modification of the switch network, principally involving memory modifications in the associated time division switch to effect the assignment change.

In accordance with a specific embodiment of this invention disclosed in detail hereinafter, the time division switch stage interconnects the defined channel(s) with specific channels on the path interconnecting the time division switch stage with the intermediate space switch. The switching data in the specific channel is applied to the switch controller of the space switch to provide specific channel interconnection instructions to the controller. The switching instructions include specific instructions to connect the specific channel to specially reserved channels on the paths extending to the time division switch stages (including the time division switch stage connected to the common control processor). Each time division switch stage is arranged to apply the switch in data thus passed to its associated specific channel to its own switch controller. The common control processor can thereby control connections of the privileged channel to any one of the reserved channels to thereby set the switching instructions to time division switches as chosen by the common control processor. The switching data is thus provided by way of internal channels to all of the time division switches and, in addition, to the space switch even though the common control processor is located at the end of the switching network. The common control processor may therefore be relocated to exchange switching data by way of any terminating circuit connected to any time division switch stage through the simple expedient of modifying the memory of such time division switch stage and through a simple cabling change to connect the time division switch stage to the space stage by way of the internal line carrying the specific channel(s).

The foregoing and other objects and features of this invention will be more fully understood from the following description of an illustrative embodiment thereof taken in conjunction with the accompanying drawings.

DETAILED DESCRIPTION

General Architecture

Figure 1:
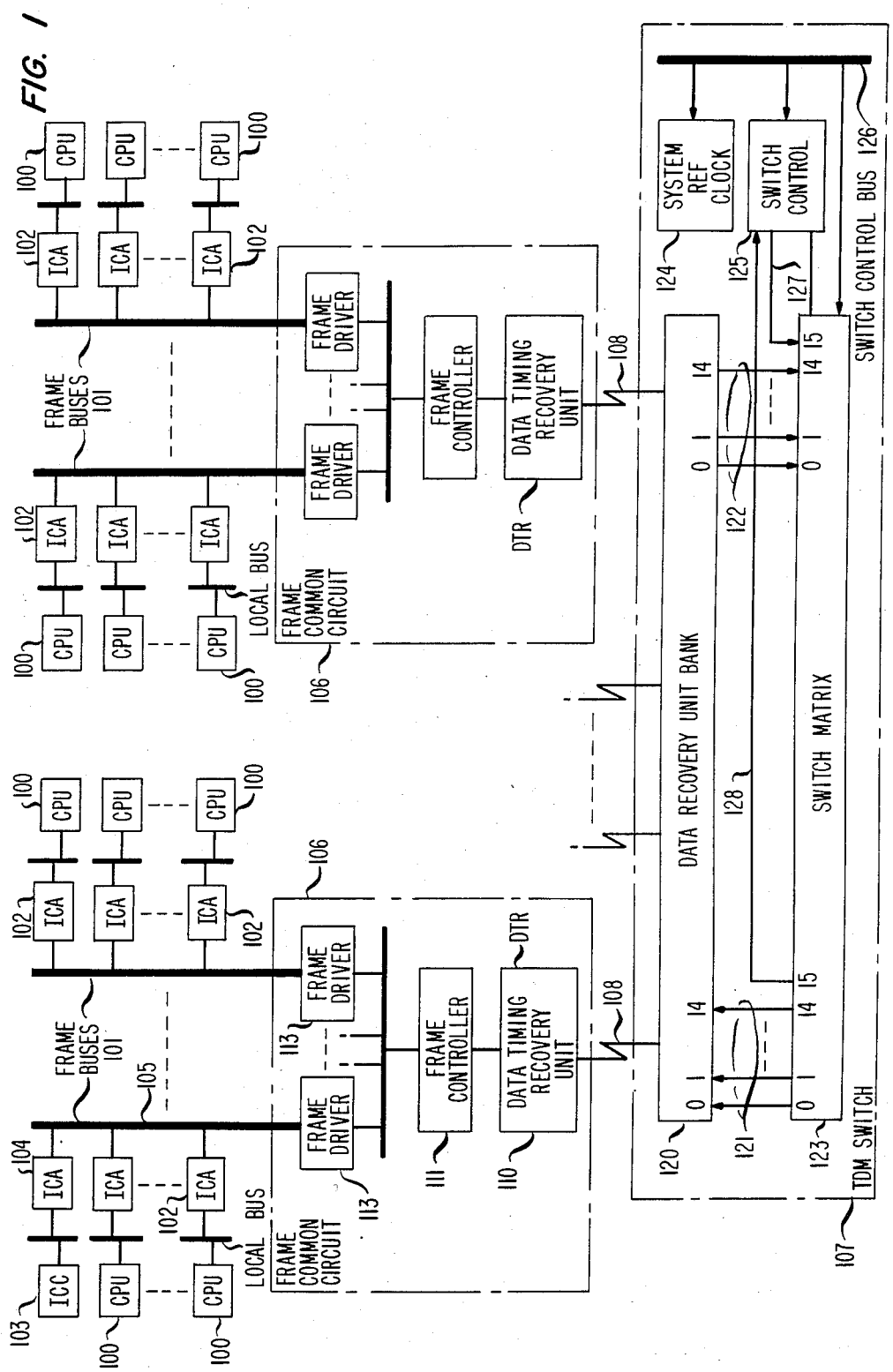
FIG. 1 discloses in block form a time division switching system and the interconnections of the various components thereof arranged in accordance with this invention.

Refer now to FIG. 1 which discloses an overview of a common control switching system, in accordance with this invention, for interconnecting computers or processors, such as CPUs 100, and setting up communication connections therebetween. Each of CPUs 100 is connected to a frame bus 101 by way of a channel adapter (ICA 102). In accordance with this invention, each frame bus 101 is connected to a plurality (such as 14) of channel adapters corresponding to ICA 102 and each channel adapter is, in turn, connected to a processor corresponding to CPU 100.

One of the processors, identified as ICC 103, is utilized for common control and administration purposes as described in detail hereinafter. ICC 103 is connected by way of channel adapter (ICA) 104 to frame bus 105. Frame bus 105 is substantially identical to frame bus 101 and supports other channel adapters corresponding to and also identified as ICA 102 and these channel adapters extend to associated processors corresponding to and also identified as CPU 100.

Groups of frame buses 101 (advantageously four buses in each group) are connected to an individual frame common circuit 106 and, in one case, three frame buses 101 and frame bus 105 extend, as a group, to an individual frame common circuit 106. The overall common control switching system contains a plurality of frame common circuits (such as 15 frame common circuits as indicated in FIG. 1). Each frame common circuit 106 is connected to time division multiplexed (TDM) switch 107 by way of an optical fiber link 108, TDM switch 107 being arranged to interconnect communication channels on optical fiber links 108. The several frame common circuits 106 are arranged in substantially the same manner and perform substantially similar functions as discussed below.

Broadly, frame common circuit 106 provides switch interconnections that set up (and take down), in part, the communication connections between the channel adapters and TDM switch 107. In addition, frame common circuit 106 allocates bandwidth for the data that is to be passed over the several interconnections that are set up. More specifically, the frame common circuit 106 provides a bus polling function that involves inserting control data in time slots (polling cycles) in various time frames of each superframe (multiple frame) on each of frame buses 101 (and 105). The control data is utilized to select ICAs and, within each selected ICA, to select terminating circuits (data buffer areas) that individually, when selected, interchange data within a specific one of the several channels supported by the frame bus. As a consequence, the polling function sets up connections for data channels on the frame bus between the frame common circuit 106 and individual data terminating circuits (buffer areas) and allocates appropriate bandwidth for each channel by polling the terminating circuit an appropriate number of times per superframe, the bandwidth of the channel being related to the amount of data that can be interchanged per time slot and the number of times that a terminating circuit is polled per superframe. In addition, frame common circuit 106 provides data connections for the various channels between frame buses 101 (and 105) and time division multiplexed (TDM) switch 107, the data connection function including a time slot interchange function for passing data from frame bus 101 (or 105) to optical fiber link 108 which extends to TDM switch 107.

As described in further detail hereinafter, each ICA, such as ICA 102, interacts with its associated processor (such as CPU 100) and with the frame bus, such as frame bus 101, providing common memory for transmitting data to and receiving data from the processor and, when polled by frame common circuit 106 for applying stored data to the frame bus or deriving data from the frame bus. More specifically, ICA 102 has a plurality of data buffer areas in common memory, each buffer area being arranged as a data terminating circuit which interchanges data with CPU 100 by way of a data bus interconnection between ICA 102 and CPU 100. Each buffer area is also arranged, as described hereinafter, to interchange this data with a time division channel on frame bus 101 (or 105), the interchange being controlled by a polling signal (in the form of a channel word) which is placed on frame bus 101 by frame common circuit 106 during an initial portion of a polling cycle (time slot) and which identifies the buffer area and a communication mode (transmit and/or received mode). The data interchange then occurs during subsequent portions of the polling cycle (time slot).

ICA 104, associated with ICC 103, similarly includes common memory for interchanging data with ICC 103 and with frame bus 105 under control of polling signals from frame common circuit 106. In the specific embodiment disclosed herein, a plurality (two in this example) of the channels available to ICA 104 for interchanging data with frame bus 105 constitute "privileged channels" which permits ICC 103 to access "controller circuits" in the frame common circuits 106 and TDM switch 107. More specifically, ICC 103 provides "switching instructions" over the privileged channels on frame bus 105 which privileged channels are extended by way of privileged channels on optical fiber link 108 to controller circuits in TDM switch 107 by the directly connected frame common circuit 106. In addition, ICC 103 provides "assignments" and "time slot interchange instructions" to controller circuits in all frame common circuits 106 (including the frame common circuit directly connected to frame bus 105) over (a) the privileged channels on frame bus 105, (b) the privileged channels on optical fiber link 108 between the directly connected frame common circuit 106 and TDM switch 107 and (c) the privileged channels on fiber link 108 between TDM switch 107 and the applicable frame common circuit 107, the connection between the channels on the fiber links resulting from the switching operation of TDM switch 107 in response to the switching instructions. Consequently, ICC 103 controls and provides the assignments and instructions for the setting up and taking down of the connections and allocating bandwidth as performed by all of the frame common circuits 106 and TDM switch 107 in the common control switching system. It is also noted at this time that a "dedicated" channel may be set up between ICA 104 of ICC 103 and each of the ICAs 102 to enable each CPU 100 to communicate with ICC 103 in order to request new connections or the taking down of existing connections.

TDM switch 107 provides the functions of a time division multiplex signal switch. More specifically, the TDM switch 107 switches incoming bits in any time slot on any one optical fiber 108, to a corresponding "outgoing" time slot on the same or any one of the other fibers 108. As suggested above, the "switching instructions" controlling TDM switch 107 is provided thereto by ICC 103 via the "privileged" channels. In addition, the ICC 103 sends switching instructions to the "controller" circuits of TDM switch 107 which may instruct the TDM switch to extend the "privileged" channels over any fiber link 108 to any frame common circuit 106. More specifically, the ICC 103 may instruct TDM switch 107 to switch incoming information on the "incoming" time slot on fiber link 108, which is reserved for a "privileged" channel from ICC 103, to a time slot on another fiber link 108 extending to another frame common circuit 106, which latter time slot is reserved for a channel connected to the "controller" circuit of such other frame common circuit 106. In this manner, the ICC 103 controls TDM switch 107 to switch assignment or time slot interchange instructions to any controller in any frame common circuit.

Frame Bus Signaling

The manner that signaling is provided on each of the frame buses, such as frame buses 101 and 105, will now be discussed. The signaling on each frame bus is divided into a plurality of time frames, advantageously at a rate of 8,000 frames per second on each bus, time frames occurring simultaneously on all buses.

Figure 2:
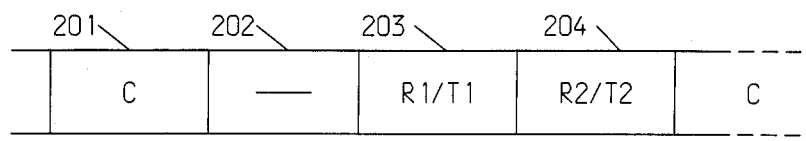
FIG. 2 depicts a timing diagram of a polling cycle of the call set-up protocol.

128 "polling cycles" are provided during each time frame. As seen in FIG. 2, a polling cycle is divided into four phases which are symbolically identified as blocks 201, 202, 203 and 204. During the first phase 201 of each of the polling cycles, the frame common circuit 106 applies a channel word to the frame buses 101 (or 105). Simultaneously, frame common circuit 106 provides a selection signal to a specific one of a plurality of selection leads on the several buses to select an individual one of the various ICAs (102, 105 et cetera) on an individual one of the buses. The channel word number advantageously comprises a multibit channel number that identifies which channel the ICA will select to interchange data with the frame bus during subsequent phases of the polling cycle. The channel word also includes a two-bit "channel type" which, in part, identifies the direction of transmission (if any). Each frame bus includes a plurality of leads, the channel word bits being simultaneously applied, in parallel, by frame circuit 106 to the frame bus leads.

No signaling is provided during the second phase 202 of the polling cycle to enable the logic circuits of ICAs 102,104 et cetera to respond to the channel word. More specifically, during the second phase 202 the ICA logic identifies the channel number and accesses common memory area, as described hereinafter, to enable the ICA to point to "appropriate" buffer area that will interchange data with the frame bus during the third and fourth phases. This "appropriate" buffer area constitutes storage reserved for the channel which is identified by the channel number in the channel word.

During the third phase 203 of the polling cycle, an envelope of data (including 8 bits of data and four control and parity bits) is exchanged between the frame bus and the ICA common memory. More specifically, after determining from the channel type whether, during the third phase, data is to be passed from the frame bus to the ICA or from the ICA to the frame bus, the ICA either obtains 8 bits of data from the common memory buffer area reserved for the channel, forms a data envelope and passes the envelope to the frame bus (which functions are designated T1 in FIG. 2) or reads the data envelope on the frame bus, obtains the data in the envelope and stores the data in the channel's buffer area (which functions are designated R1 in FIG. 2). During the fourth phase 204 of the polling cycle a second envelope of data may be similarly exchanged between the frame bus and the ICA common memory, the direction of the exchange being identified by the "channel type"

bits in the channel word (and the functions being designated R2 and T2 in FIG. 2).

Recalling now that there are 8,000 frames per second, that there are 128 polling cycles per frame and that two envelopes may be exchanged between the ICA common memory and the frame bus per polling cycle and further recalling that each envelope includes 8 bits of data, the signaling speed of the frame bus can be calculated to be approximately 16 Mbits per second. Therefore, expressed in another manner, the bandwidth available for data on each frame bus is 16 Mbits per second.

With respect to the bandwidth available on each frame bus, each channel on that bus may occupy various portions of that bandwidth. Since each frame bus has selection leads for selecting any ICA during each polling cycle, any individual ICA may be selected by the frame common circuit 106 during one or more polling cycles of any frame. Since a channel is selected by the channel word, any channel served by any ICA may be used for signaling during the one or more polling cycles of any frame that the ICA is selected. Finally, different ICAs and different channels may be selected during alternative polling cycles. Various portion of the bandwidth available on the frame bus may therefore be selected for each of the channels.

Frame Common Circuit

The frame common circuits 106 are substantially identical and generally include data timing recovery unit (DTR) 110, frame controller 111 and a plurality of frame drivers 113. Each frame driver 113 constitutes an interface between an associated one of the frame buses (101 and 105) and frame controller 111. The general functions of the frame drivers 113 are to pass the channel words from frame controller 111 to the frame buses (101 and 105), to exchange data between the frame controller 111 and the frame buses and to apply the selection signals to the appropriate selection leads on the frame buses in accordance with "instructions" from frame controller 111.

Frame controller 111 provides the general functions of polling of the ICAs by way of the frame drivers and buses, time slot interchanging of the data derived from the frame drivers for application to the optical fiber link 108, by way of data timing recovery unit (DTR) 110, and passing data received by DTR 110 (from the fiber link 108) to the frame drivers 113. Generally, polling constitutes the application of channel words and selection signal "instructions" to the frame drivers 113, which words and instructions are stored in a polling list which is calculated by the ICC 103 and sent to the frame controller 111 by way of the privileged channels, as previously indicated.

Figure 11:
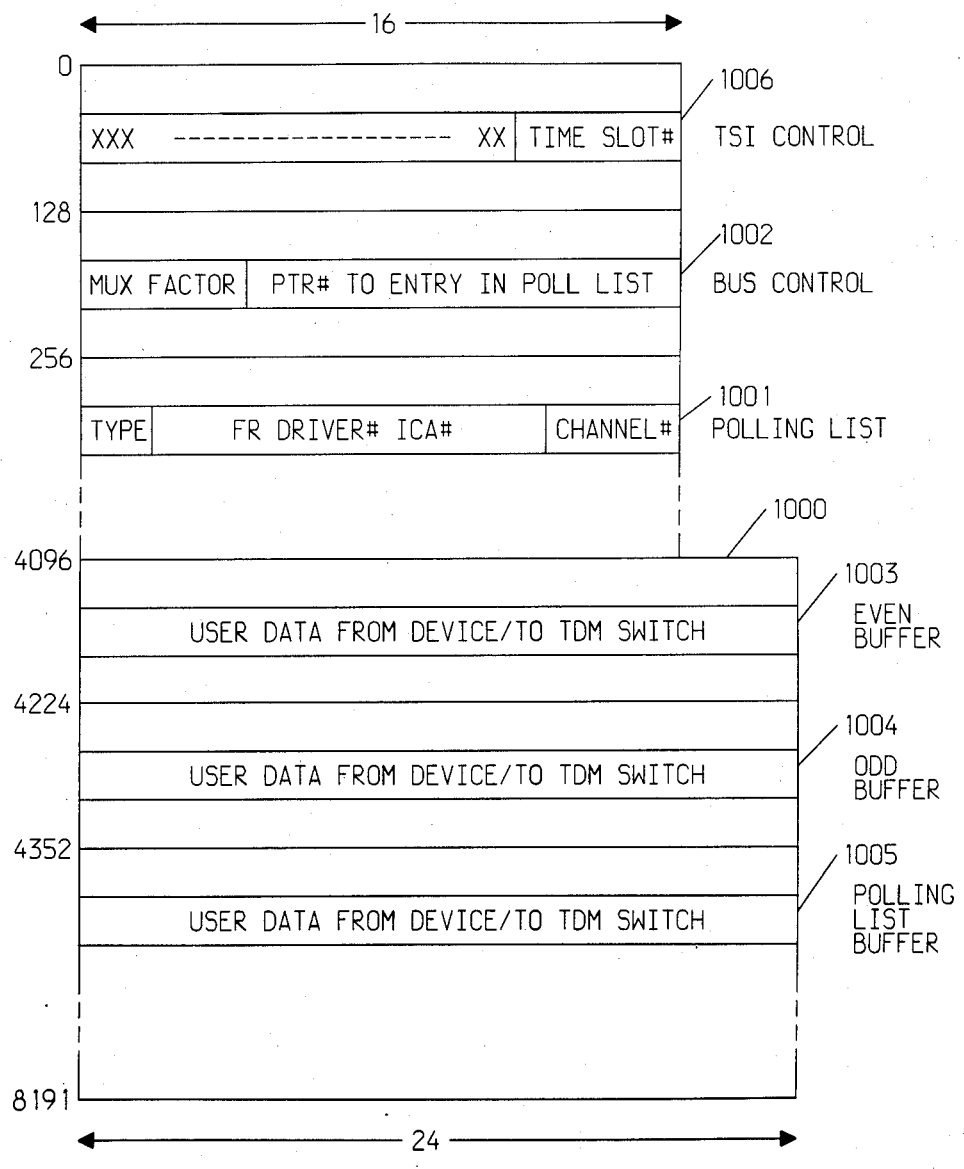

The polling list is stored in a frame controller common memory which is symbolically shown a memory 1000 in FIG. 11. The polling list includes a plurality of entries, each polling list entry, such as entry 1001, is associated with a channel and includes an ICA number, a frame driver number and a channel word. The polling list entries are arranged in accordance with the polling cycle (time slot) that the channel is polled and there may be a plurality (in this case 4) entries for each time slot to permit different channels to be polled during different time frames in a superframe (which comprises, for example, 256 time frames). Associated with the polling list in memory 1000 is a bus control list which includes an entry, such as entry 1002, for each polling cycle (time slot). Each bus control list entry includes a "multiplexing factor" that specifies the number of times a channel in a time slot will be polled during a superframe. As described in detail hereinafter, the multiplexing factor is utilized during each polling cycle, to select a poll list entry. A specific frame driver number and ICA number is therefore obtained together with a channel word and the entry is passed to the frame drivers 113. A frame driver is thereby selected and the ICA number is decoded by the selected frame driver 113 which, in turn, enables the appropriate one of the selection leads on the frame bus (101 or 105). The channel word is passed to the frame bus by the frame driver and is acted upon by the ICA selected by the enabled selection lead.

During the third and fourth phases of the polling cycle, frame controller 111 obtains data envelopes from and/or passes data envelopes to the frame drivers 113. Data envelopes passed to the frame drivers are obtained by frame controller 111 from the incoming optical fiber link 108 by way of DTR 110 at appropriate instances of time which as further described below corresponds to the third and/or fourth phase of the polling cycle. These envelopes are passed directly to the frame drivers 113 which, in turn, pass the envelopes to the frame buses (101 and 105) in the corresponding phases of the polling cycle. Data envelopes obtained from the frame drivers 113 are placed in a polling list buffer by frame controller 111. The entries in the polling list buffer (which are individually shown as entry 1005) are individually associated with each of the ICA number and channel word entries. This data will then be passed to a time slot interchanger during the next time frame less one assigned to that ICA channel, as described in detail hereinafter.

The time slot interchanger includes a time slot interchange control memory which has buffer area in the common memory 1000 to accommodate an entry, such as entry 1006, for each time slot. The interchanger also includes an odd buffer and an even buffer, each of these buffers having sufficient memory area to store an entry, such as entry 1004 and entry 1003, for each time slot. Time slot interchanging is controlled by the time slot interchange control memory entries (1006) which are also supplied by the ICC 103. When the data is supplied to the interchanger, as described above, it is stored in an odd buffer 1004 or an even buffer 1003. The time slot interchanger control memory entry (1006) for the time slot then identifies the time sequence that the data is withdrawn from the buffer and passed to DTR 110. As the data is withdrawn from the even buffer 1007, for example, data is inputed by the polling list buffer to the odd buffer 1004. Alternatively, when data is withdrawn from the odd buffer 1004, the data from the polling list buffer 1005 is passed to the even buffer 1003.

The data timing recovery units 110 of frame common circuit 106 are substantially identical and individually provide the interface between the frame common circuit 106 and the optical fiber link 108. Signals received from the time division multiplexed switch (TDM switch) 107 contain control or instruction data or data to be distributed to the various ICAs together with timing or clocking information. The data timing recovery unit (DTR) 110 recovers the clocking information in the data stream on fiber link 108 and decodes the data for application to frame common circuit 106 for distribution to the frame drivers 113. The clocking information recovered from the data stream on the link is used to provide timing functions in DTR 110 and in frame common circuit 106.

The data which has been processed by the time slot interchanger in frame controller 111 and is destined for the time division multiplexed switch 107 is passed to the DTR 110 for application to optical fiber link 108. The above-described clocking information recovered by DTR 110 from the incoming stream on optical fiber link 108 is now used to clock out data to optical fiber link 108. The outgoing data from frame common circuit 106, thus encoded with the recovered clocking signal, is then passed to the time division multiplexed switch 107 by way of optical fiber link 108.

Time Division Multiplex Switch

The time division multiplexed switch (TDM 107) comprises four principle components. These components are the data timing recovery unit bank 120, the switch matrix 123, switch controller 125 and system reference clock 124.

Data timing recovery unit bank 120 comprises 15 data timing recovery units which are arranged in substantially the same manner and operating in substantially the same manner as data timing recovery unit 110 in frame common circuit 106. Each data timing recovery unit in data timing recovery unit bank 120 interfaces, on one side, one of the fiber links 108. The other side of each data timing recovery unit of data timing recovery unit bank 120 is connected to the switch matrix 123. Data is passed from each data timing recovery unit in data recovery unit bank 120 to the switch matrix 123 over an individual one of 15 paths collectively designated as paths 122 and similarly data is passed from the switch matrix 123 to each data timing recovery unit of the data timing recovery unit bank 120 over an individual one of 15 paths collectively designated as paths 121. The data stream from each optical fiber 108 is received by the associated data timing recovery unit in data recovery unit bank 120, the timing signal is recovered and the data is decoded and passed over the associated one of paths 122 to the switch matrix 123. In the other direction the data from the switch matrix together with timing or clock signals from the system reference clock are passed over an associated one of the paths 121 to an individual data timing recovery unit in data recovery unit bank 120. The individual data timing recovery unit then encodes the data with the clock and passes this stream of information on to the associated one of optical links 108.

Switch matrix 123 comprises a time division multiplexed switching element that switches data in any time slot on any input lead to a corresponding time slot on one (or more) of the output leads in accordance with instructions supplied by switch controller 125 by way of switch control bus 126. The switch matrix thus constitutes a well-known multiplex signal switch for providing space switching of signals on a time slot basis.

The switch controller 125, as noted above, provides instructions to the switch matrix 123 over bus 126, designating the switching operations of the matrix. The instructions for the switch controller 125 are provided by the ICC 103 over the "privileged" channels, as described below.

Referring again to FIG. 1, it is noted that signal path 127 extends from the switch controller 125 to input terminal 15 of the switch matrix 123. In addition, signal path 128 extends from output terminal 15 of the switch matrix 123 to an input of the switch controller 125.

When the ICC 103 provides its switching information, the individual data timing recovery unit in the bank 120 connected to the optical fiber link 108 (which carries the "privileged" channel from ICC 103 via frame common circuit 106) receives the switching information in the time slot(s) assigned to the privileged channel. The individual data timing recovery unit decodes the switching information and passes the information in the time slot(s) over paths 122 to the appropriate input terminal of the switch matrix 123.

The switch matrix 123 is arranged to switch that information to output terminal 15. The switch information from the ICC 103 is therefore passed over path 128 to the switch controller 125 and the switch controller is thereupon enabled to act upon this information as described below.

If ICC 103 indicates in the switching information code that the switching information is directed to the switch controller 125, the switch controller will take appropriate action including modifying the instructions provided to switch matrix 123 over bus 126. In addition, switch controller 125 responds to the ICC 103 by acknowledging reception of the switching instructions by signaling with the time slot(s) assigned to the privileged channel over the previously described output path 127 extending to input terminal 15 of the switch matrix 123. The switch matrix, in turn, under control of the switching instructions of switch controller 125 on bus 126 switches this acknowledgment to the appropriate output terminal whereby the acknowledgment is passed back through the appropriate DTR in bank 120 and then (in the appropriate time slot) back to the ICC 103.

If the ICC 103 instructs the switch controller 125 that it desires to send assignment and time slot interchanger information to a frame controller 111 of a remote frame common circuit 106, such instructions (switching information) is sent to the switch controller 125 and the acknowledgment is returned to the ICC 103, as described above. The switch controller 125 sends new switching instructions to the switch matrix 123 and when the subsequent assignment and time slot interchanger information (destined for the remote frame control circuit 106) is received from the ICC 103, it is now switched by switch matrix 123 to an appropriate one of output terminals 0–14. This information on the appropriate one of output terminals 0–14 is then passed through path 121 and an individual data timing recovery unit in bank 120 over the appropriate optical fiber link 108 to the destination frame common circuit 106 and the frame controller 111 thereat recognizes that the information is being received in a time slot reserved for the ICC 103 and will thereupon act upon such information.

Channel Adapter

As noted above, each channel adapter, such as ICA 102 or ICA 104, provides an interface between the frame buses 101 or 105 and the associated processor, such as CPU 100 or ICC 103. Each channel adapter has the capability of terminating or handling four types of channels. These four types of channels will be hereafter designated "block transmit" channels, "block receive" channels, "character" channels and "register" channels.

To accommodate the "block transmit" channel, the channel adapter is arranged to receive and store data from the processor a block at a time and (as described in further detail hereinafter) pass the block of data, two envelopes at a time within each polling cycle, to the frame bus 101 or 105 until the block of data is exhausted, whereupon an event is posted to inform the processor (CPU 100 or ICC 103) that the block of data has been passed to the frame bus. An event is posted by writing the channel number that causes the event into memory (which is controlled in a way that causes the memory to appear as a first-in, first-out buffer, commonly known as a FIFO, as described in detail hereinafter). For the "block received" channel mode, the channel adapter is arranged to accept from the frame bus two envelopes during each polling cycle until a block of data has been received, whereupon an event is posted to inform the processor that the channel adapter is storing an incoming block of data. For the "character transmit" channel mode, the channel adapter stores data received from the processor in a circular FIFO (first-in first-out register) and (as described in further detail hereinafter) the data is removed from the FIFO and passed to the frame bus an envelope at a time during each polling cycle. In this mode, the FIFO simply acts as an elastic store. For the "character receive" channel mode, data from the frame bus is passed an envelope at a time during each polling cycle to the circular FIFO and the processor withdraws the data from the FIFO asynchronously with respect to the incoming data from the frame bus. For the "register channel" mode, the channel adapter passes one envelope of data (in a "send buffer") to the frame bus and accepts and stores one envelope of data from the frame bus (in a "receive buffer") during each polling cycle. When the data in the "receive buffer" differs from the data that is presently being received from the frame bus, an event is posted to advise the processor that new data is being received. In this mode, of course, the channel adapter is capable of providing duplex transmission.

To further understand the function of the channel adapter (102 or 104), it is first broadly noted that memory in the channel adapter constitutes control memory and data memory. The control memory, in turn, is divided into "fixed" memory information (that is normally changed only for the fundamental network changes) which information comprises a processor control word (PCW) for each channel and "variable" memory information (that is updated for various transactions) which information comprises an ICA control word (ICW) for each channel.

When the channel adapter handles the block or character mode, the PCW stores the address segment number (or most significant address bits) of the address of the data memory area assigned to the channel. In addition, the PCW also stores the end address of the data memory area assigned to the channel. The ICW stores the envelope address in the data memory, that is, the data memory address of the data envelope which is presently being transferred. The ICW also stores channel state information such as, for example, the idle or busy state of the channel and the present state of the data memory, which present states include whether the data memory is waiting for a data transfer, is presently transferring data or has completed data transfer and is ready to post an event.

Figure 3:
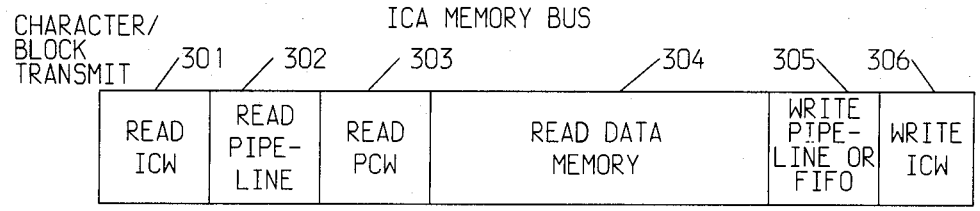
FIGS. 3, 4 and 5 disclose timing diagrams illustrating specific processes provided by terminating circuits during each polling cycle.

In the block mode, the polling cycle is divided into eight read/write subphases. Referring to FIG. 3 which depicts the functions of the eight subphases for the block transmit mode, during the first subphase 301 the control word is read out of the ICW to immediately ascertain the channel state and, of course, to also obtain the data address of the data envelope presently being transferred. During the next subphase 302, the information in the "pipeline" is obtained, which information constitutes the data obtained in the prior polling cycle from the data memory and this data is passed on to the frame bus. In the next or third subphase 303, the PCW word is read out and with the PCW and ICW information available the data is read out of the data memory during the fourth, fifth and sixth subphases which are collectively designated subphase 304 in FIG. 3. The data thus read out of the data memory is then written into the "pipeline" during the seventh phase 305. Alternatively, in the event that the data transfer has been completed (for the block transmit case), the channel number is written into the event FIFO during the seventh subphase 305. The ICW word is then incremented or the appropriate state changes are noted during the final or eighth phase 306.

Figure 4:
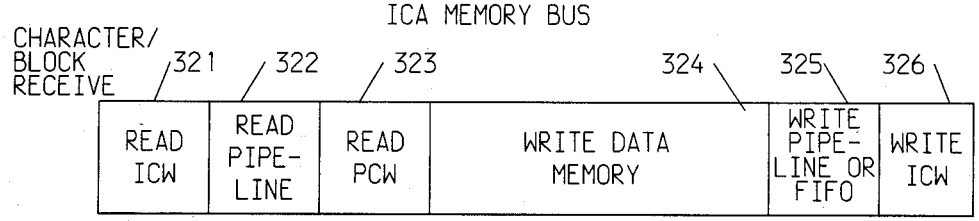

The functions of the channel adapter for the read/write subphases of the polling cycle, when in the block receive mode, is seen in FIG. 4. The ICW word is correspondingly read in the first subphase 321. In the second subphase 322, the data in the "pipeline", which was written into the "pipeline" in the previous polling cycle, is read and the PCW word is then read during the third subphase 323. The data read from the "pipeline" is then written into the data memory during the fourth, fifth and sixth subphases collectively identified as subphase 324. In the seventh subphase 325, the data in the frame bus is transferred to the "pipeline". In the eight phase 326, the ICW word is incremented or the channel state information is changed.

For the register mode case, the PCW word principally contains the transmit data, that is, the data which is to be passed to the frame bus. The ICW word contains the receive data or the data received from the frame bus together with a data comparison bit designating whether the data presently stored differs from the data presently being received from the frame bus.

Figure 5:
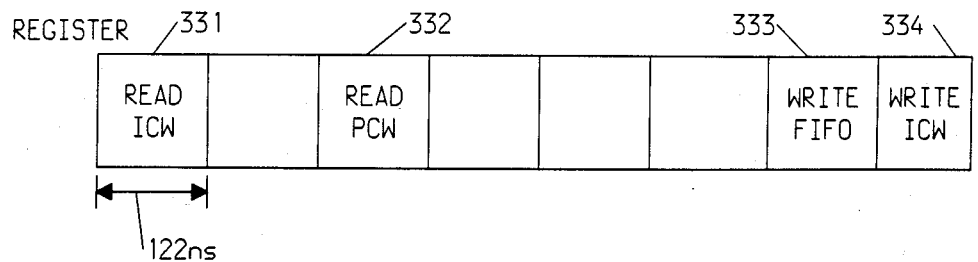

When the channel adapter is in the register mode, four significant functions occur during the channel polling cycle read/write subphases as seen in FIG. 5. The first function which occurs during the first subphase 331 constitutes reading the ICW word. This involves the data obtained from the frame bus during the prior polling cycle and permits the channel adapter to compare this data with the data presently being received on the frame bus. The next significant function occurs during the third subphase 332 and constitutes reading the PCW word which, as noted above, contains the data from the processor that is to be transmitted and an envelope of this data is now passed to the frame bus. The next function occurs during the seventh subphase 333 and constitutes writing the channel number to the event FIFO in the event that the data on the frame bus differs from the data read from the ICW word during subphase 331. For the final function, which occurs during the eighth subphase 334, the ICW word is updated by overwriting the data newly received from the frame bus.

Channel Adapter Detail Arrangement

Figure 6:
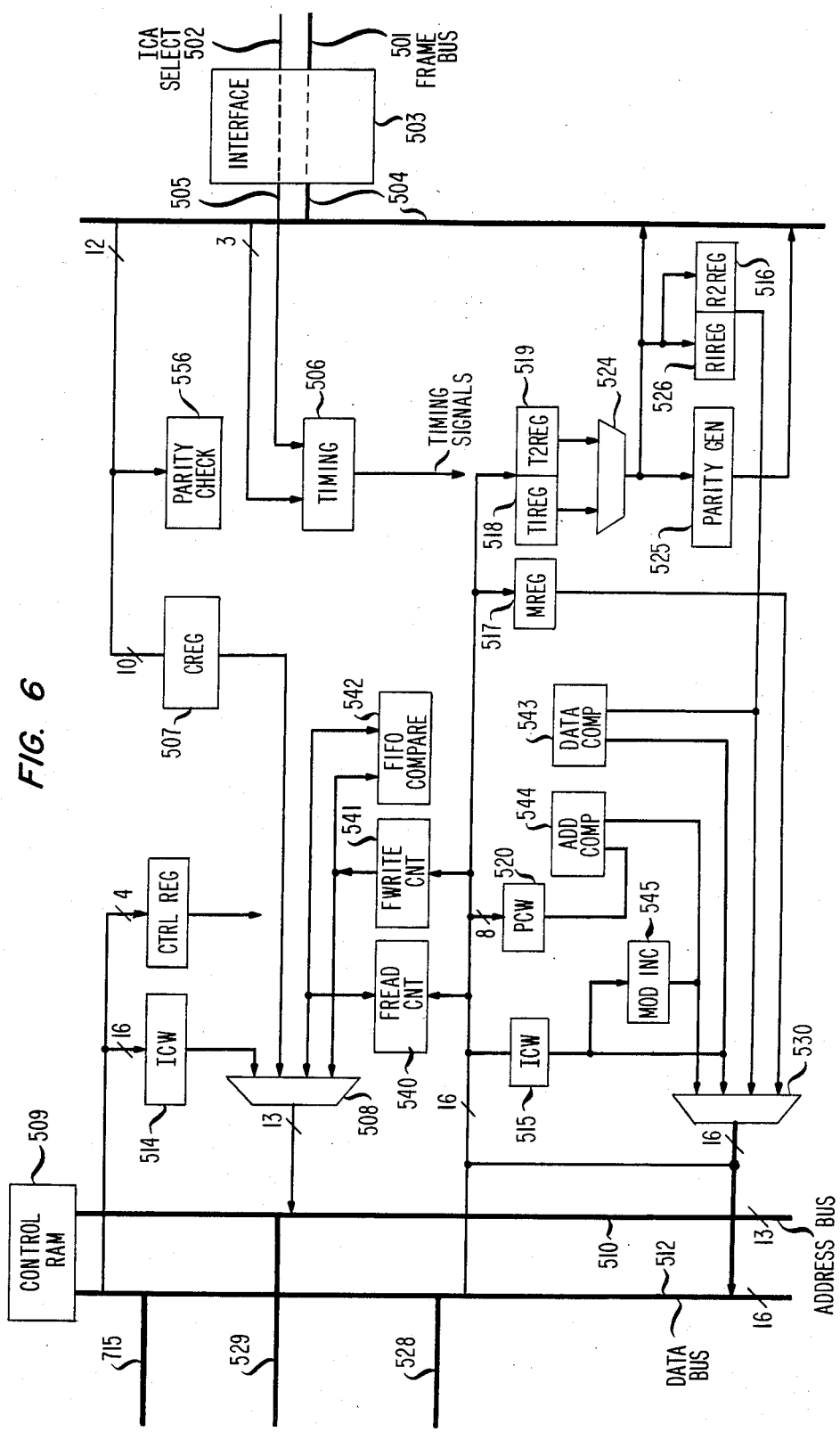
FIGS. 6 and 7, when horizontally aligned, show the details of the circuits and equipment of a terminating circuit arranged in accordance with the present invention.
Figure 7:
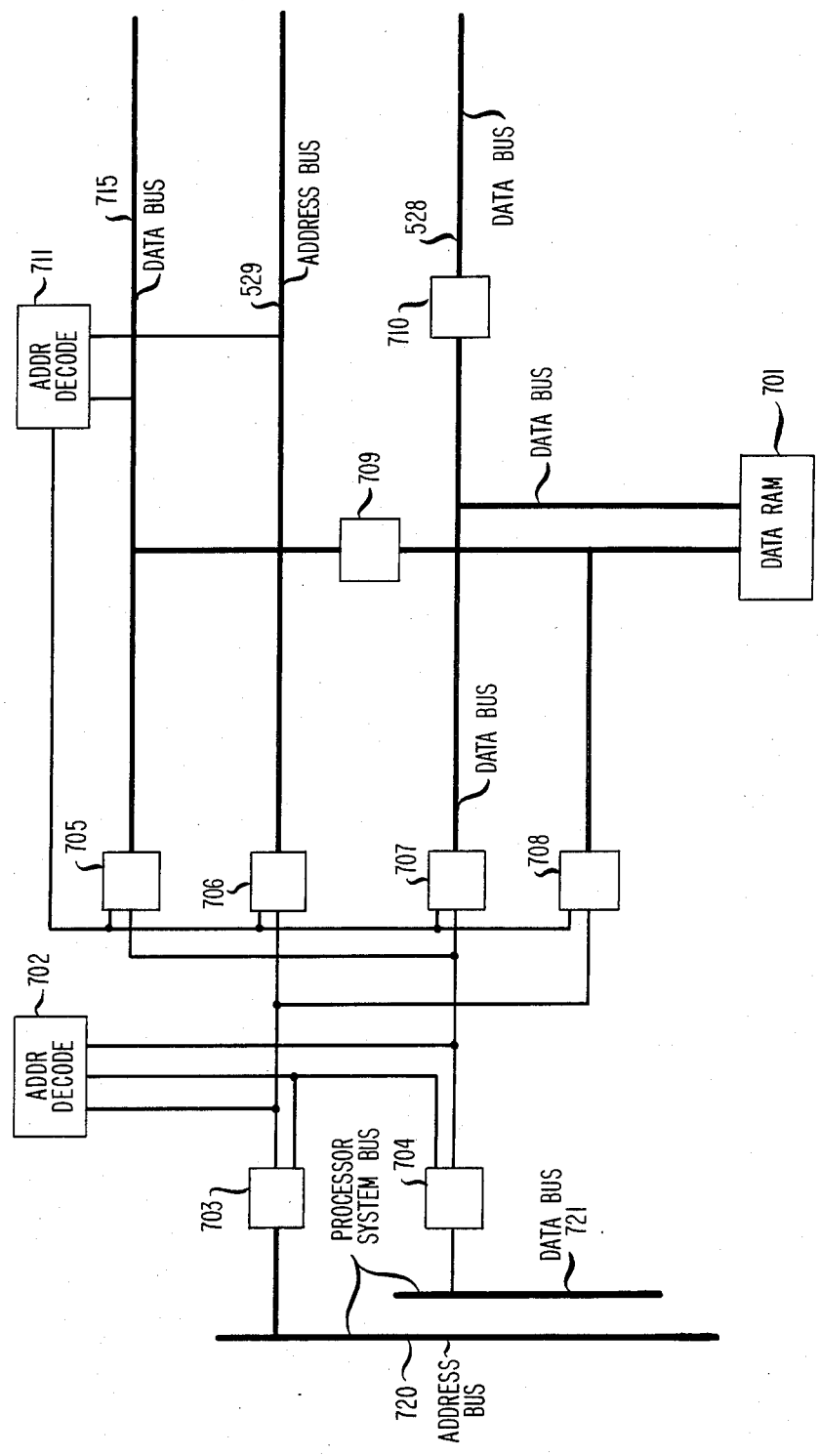

The details of a typical channel adapter, such as ICA 102 or 104, is shown in FIGS. 6 and 7. As previously noted, the channel adapter, on one side, interfaces the frame bus (101 and 105) and, more specifically, is directly connected to the bus leads (designated frame bus 501 in FIG. 6) and to the select lead of the frame bus associated with the channel adapter (designated ICA select lead 502). An interface circuit 503 advantageously extends bus 501 and lead 502 to multilead internal bus 504 and internal select lead 505.

Timing and clock signals for various components and logic circuits of the channel adapter is provided by timing circuits 506. Timing circuits 506 includes standard timing circuits which are enabled or selected by the previously described channel adapter select signal received from frame common circuit 106 over select lead 505. When thus selected, timing circuit 506 recover the incoming clock signals on the frame bus 504 and identify the start or beginning of each of the polling cycles. Timing or clock signals thus recovered by timing circuits 506 are then distributed to the various components in the channel adapter by way of various leads (not shown).

Channel register 507 is arranged to receive and store the channel number which is on the frame bus during the first phase 201 of the polling cycle. When the channel adapter is selected and timing circuits 506 are enabled, as described above, appropriate timing signals are received by channel register 507 from timing circuits 506. This enables channel register 507 to pick off the channel number on bus 504 and passes the channel number to multiplexer 508. Multiplexer 508, in turn, is enabled by the timing signals to pass the channel number output of channel register 507 through, during the first subphase (301, 321, 331), to address bus 510. The appropriate address word is thus applied to control RAM 509 to access and read out the ICW word in the memory area reserved for the channel which will be accommodating the data exchange. The bits of the ICW word thus read out of control RAM 509 are passed, in parallel, by way of data bus 512 to ICW register 514 and ICW register 515 and the registers, under control of the timing signals, read off the ICW word from the bus. As noted above, these functions are provided during the first read/write subphase (301, 321, 331) of the polling cycle. In addition, during the first subphase (301, 321, 331), register 516 is enabled by the timing signals to correspondingly read the channel number from the bus 504. In this case, the channel number will be stored in register 516 for possible subsequent use if an event (described hereinafter) should occur.

For the second read/write subphase (in the character/block modes 302, 322), channel register 507 again generates the channel number, supplemented by appropriate additional bits to constitute the "pipeline" address. This "pipeline" address is passed through by multiplexer 508 to address bus 510 and the data in the "pipeline" presently stored in control RAM 509 is read out to data bus 512 and passed, in parallel, to register 517 and to T1/T2 registers 518 and 519 and the registers, enabled by the timing signals, store the "pipeline" data, register 518 storing data for one envelope and, when necessary, register 519 storing data for the subsequent envelope.

For the third read/write subphase (303, 323), channel register 507 again generates the channel number with appropriate additional bits to construct the address of the memory area storing the PCW word of the channel. The PCW word address is passed by channel register 507 to multiplexer 508 and the multiplexer is enabled in the third subphase to pass the address to address bus 510. Control RAM 509 thereupon reads out the PCW word to data bus 512. The end address portion of the PCW word is tead and stored by PCW register 520 (being enabled by the timing signals) while the address segment number of the PCW word is read and stored in latch 706 (shown in FIG. 7).

The next three read/write subphases are identified for the transmit and receive cases as subphases 304 and 324, as noted above. When the channel adapter is in the transmit mode and read/write subphase 304 is entered, the "pipeline" data information (envelope) presently in T1 register 518 is read out through multiplexer 524 under control of the timing signals from timing circuits 506 and passed to bus 504. This data then continues through frame bus interface 503 to frame bus 501. Parity generator 525, under control of these timing signals, scans the data bits of the envelope on bus 504 and generates the appropriate parity bits, which parity bits are then passed, in turn, to bus 504 in parallel with the application of the data envelope to the bus. The parity bits augment the envelope on bus 504 and passed by way of interface circuit 503 to frame bus 501.

After the first envelope is passed to frame bus 501, multiplexer 524 is enabled by the timing signals to read out the "pipeline" data information (envelope) presently in T2 register 519. Multiplexer 524 thereupon passes the envelope to bus 504 in the same manner as the first envelope is passed to the bus. The parity bits are similarly generated by parity generator 525 and also passed to bus 504 as an extension of the data envelope. The data envelope with the appended bits is thereby correspondingly passed through bus interface circuit 503 to frame bus 501.

If the channel adapter is in the "receive" mode when the read/write subphase 324 begins, the data envelope on frame bus 501 which has been passed through interface 503 to bus 504 is picked off and placed in R1 register 526 under control of the timing signals. When the second data envelope is received on frame bus 501 and passed through interface 503 to bus 504, it is similarly picked off by R2 register 516. As the data envelope is received from the frame bus 501 and 504, the data bits are scanned and appropriate parity is generated and compared with the accompanying parity bits by parity checker 556. If there is a difference the reception of data for the remaining subphases is inhibited and an error indication is placed in the channel word ICW. The reception and storage of the second data envelope in R2 register 516 overwrites the channel number priorly placed in the register. As noted hereinafter, the channel number priorly written into R2 register 516 is utilized only when an event is to be posted and, if such event is to be posted, no data would be presently being received in this second data envelope.

Returning now to the transmit and receive modes of the channel adapter, it is again recalled that the adapter is presently in the fourth, fifth and sixth read/write subphases, which are identified as subphases 304 and 324. During these subphases of the polling cycle and concurrently with the above-described interchanging of the "pipeline" data, multiplexer 508 is enabled by the timing signals to read that the portion of the ICW word (stored in ICW register 514) which constitutes the address in the data RAM (RAM 70 shown in FIG. 7) of the channel memory area that the channel utilizes to store the "pipeline" data. This address (portion) is passed by multiplexer 508 to address bus 510 and then by way of interface 522 to address bus 529. At the same time, the timing signals enable various latches shown in FIG. 7 (and described in detail hereinafter) to read out the address segment number to bus 529. If the channel adapter is in the transmit mode, the "pipeline" data is thereby obtained from data RAM 701 and passed by way of data bus 528 and interface 522 to data bus 512. This "pipeline" data is thereupon picked off by M register 517 under control of the timing signals. If the channel adapter is in the receive mode, multiplexer 530 is enabled by the timing signals to read the "pipeline" data presently in M register 517 and pass this data to data bus 512. The "pipeline" data on data bus 512 is then applied by way of data memory interface 522 to data bus 528 and, with the above described address data on bus 529, the data on bus 528 is thereupon stored in data RAM 701 in the channel memory area reserved for the "pipeline" data.

During the seventh read/write subphase of the polling cycle (subphases 305, 325, 335), channel register 507 again generates the channel number and appropriate additional bits under control of timing circuits 506, which number and additional bits designate the pipeline address in control RAM 509. This address is applied through multiplexer 508 to address bus 510 to enable the writing of a data word into control RAM 509. For the "transmit" case of the channel adapter, multiplexer 530 identifies that the adapter is in the transmit mode from the channel word output of register 507 and reads out the pipeline data from M register 517, passing the data to data bus 512. The pipeline data is thereupon placed in the pipeline data area reserved for the channel in control RAM 509. In the "receive" case of the channel adapter, multiplexer 530 notes the channel "type" from the output of channel register 507 and, determining that the channel adapter is in the receive mode, enables the application of the received data in R1 register 526 and R2 register 516 to data bus 512. This stores the incoming data in the memory area reserved for the pipeline data in control RAM 509.

For register channel operation, reception of a channel number by CREG register 507, and operation of READ ICW phase 331 are substantially similar to those actions for the block transmit channel and block receive channel cases. At the end of the first phase in each of the three cases, the ICW read from control memory 509 has been copied to ICW registers 514 and 515, and the channel number is in CREG register 507 and R2REG register 516.

In the second phase 335 of register channel operation, the channel number is transferred from R2REG register 516 to MREG register 517 through multiplexer 530 for possible use later if an event must be posted by writing the channel number to the event FIFO.

For the third subphase 332 of register channel mode, channel register 507 again generates the channel number with appropriate additional bits to construct the address for the memory area storing the PCW word of the channel. The PCW word address is passed by channel register 507 to multiplexer 508 and the multiplexer is enabled to pass the address to address bus 510. Control RAM 509 thereupon read out the PCW word to data bus 512. Data bus 512 carries the PCW to PCW register 520 and T2REG register 519.

For the fourth subphase of register channel mode, the PCW is transferred to T2REG register 519. In the fourth subphase of register channel mode, the data received from the Frame Bus 501 during the R1 phase of the Frame Bus cycle, via interface 503 and the internal extension of the Frame Bus 504, is stored off in R1REG 526.

During the fifth subphase and sixth subphase of register channel mode, the data to be transmitted, taken from the PCW previously stored in T2REG register 519, is transferred via multiplexer 524 to the internal extension of the Frame Bus 504 and interface 503 to Frame Bus 501. The data from T2REG register 519 also travel to parity generator 525, the output of which augments the data, traveling the same path via bus 504 and interface 503 to Frame Bus 501.

In the sixth subphase of register channel mode, the previously received data in R1REG register 526 are compared in data comparator 543 to the previously received data field of the ICW stored in ICW register 515.

In the seventh subphase 333, if the comparison of the sixth phase indicates a difference between the data in the ICW and that received in R1REG 526, an event is written to the event FIFO, using the channel number previously saved in MREG register 517, passing via multiplexer 530, and data bus 512 to control RAM 509, as described hereinafter.

In the final phase 334 (the eighth phase), the ICW is written back to the control RAM just as it was for the eighth phases of block receive mode 306 and block transmit mode 326.

The event FIFO uses a fixed memory address not corresponding to any physical memory and a fixed block of control memory. When the processor attempts to the special address, the attempt is recognized in an address decoder, which disables the buffers for the memory address supplied by the processor and enables FIFO read address counter/register 540 the output of which is augmented with fixed bits defining the address of the FIFO memory block, supplies a substitute read address. Certain bits read out of the control RAM in a FIFO read cycle are replaced by FIFO status bits maintained in the FIFO control circuitry: the FIFO full bit and the FIFO empty bit. The FIFO full bit is cleared after a read. If the FIFO empty bit is off, the FIFO offset address in the FIFO read address counter/register 540 is incremented. The read address is compared to the write address in write address counter/register 541 using comparator 542.

In FIFO write cycles, initiated by the ICA internally in the seventh subphase 305, 325 or 333, the address is supplied by the FIFO write address counter/register 541 augmented by fixed bits defining the address of the FIFO block. If the FIFO full bit is off, a FIFO write cycle takes place, the FIFO empty bit is turned off or kept off, the FIFO write address counter/register is incremented, and compared to the read address in comparator 542 and if there is a match, the FIFO full bit is turned on.

Since memory is used as a fixed circular buffer, carries out of the high order bits of the address counters/registers when they are incremented are ignored, thereby allowing addresses to wrap around to zero after reaching the address of the end of the buffer.

The interchange of data between a processor, such as CPU 100 and the ICA, such as ICA 102, is handled by the circuitry shown in FIG. 7. When information is passed from data bus 512 to data RAM 701, the envelope of data is applied through bus 715, as previously described. At the same time, the appropriate address in the memory of data RAM 701 is applied to address bus 529 from address bus 510. Address decoder circuit 711 identifies whether or not the data is to be stored in RAM 701. In that event, address decoder 711 unlocks gates 709 and 710. The appropriate address information is thereby passed through gates 709 to enable the application of data through bus 528 and gate 710 to the appropriate stored areas in data RAM 701.

The processor, such as CPU 100, controls the interchange of data with either RAM 701 or with data bus 512 directly (as in the register mode). Address information is applied by the processor to address bus 720 and then fed to buffer 703. Address decoder 702 identifies whether or not the interchange of data is to be with data RAM 701 or data bus 512. In the former event, gates 707 and 708 are enabled. This prepares a data path between CPU 100 and data RAM 701 by way of data bus 721, buffer 704, gate 707 and the data bus input to RAM 701. At the same time, an address or control data path is prepared between CPU 100 and the address bus input to RAM 701 by way of address bus 720, buffer 703, gate 708 and the address input to RAM 701.

Alternatively, the processor is directly accessing data bus 512 (as in the register mode). Address decoder 702 enables gates 705 and 706. This completes a two-way data path from the processor through data bus 721, buffer 704, gate 705 and data bus 715 to data bus 512. The control or address path is completed from address bus 720, buffer 703 and gate 706 to address bus 529 which extends to address bus 510.

Frame Controller Details

Figure 8:
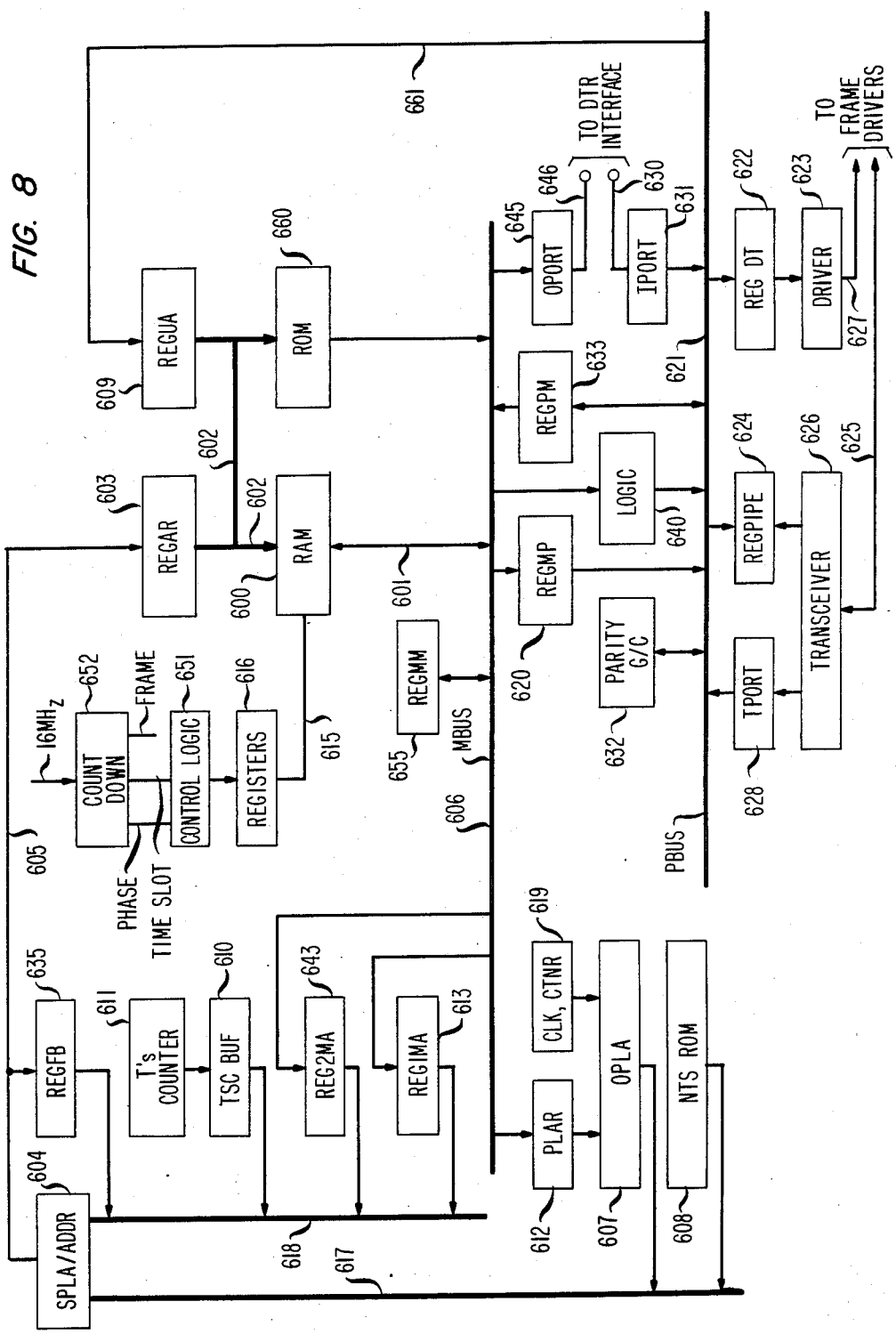
FIG. 8 shows the details of the circuits and equipment of the switching control circuitry providing the call set-up protocol and the switching information.

During each polling cycle (time slot) the various components of the frame controller 111 are selectively enabled at appropriate subphase instances by timing signals from the common clock system (not shown) that is locked to the clocking signals recovered by data timing recovery unit 110 described above and shown in FIG. 1. As indicated above, the frame controller 111 provides frame bus control, bus polling and time slot interchanging. Memory and storage area for these functions, including memory area for bus control, the polling list, time slot interchange control, the odd and even buffers and the polling list buffer are provided by RAM 600 (FIG. 8).

Addressing information for RAM 600 is provided by way of address bus 602, the addressing information being applied to bus 602 by register 603 or register 609. Control signals such as read/write instructions are passed to RAM 600 by way of multiple leads 615, which instructions are derived from registers 616. RAM 600 under control of such instructions and the addressing information interchanges data with memory bus 606 by way of leads 601. In the frame controller, the memory (RAM 600) is accessed eight times per time slot. A bus control read, a polling list read and a polling list buffer write are required to implement the polling function of the frame controller. An additional polling list cycle is required for the dual simplex operation, as described later. To implement the time slot interchange function, a read from the polling list buffer, a read and a write to the even/odd buffers, and a read from the time slot interchange control section of the frame control memory are required.

The generation of addressing information for register 603 is provided by adder 604. Input data for adder 604 is initially derived from time slot buffer 610 and offset program logic array 607. Time slot buffer 610 is controlled by time slot counter 611 which, in turn, is driven by timing signals from the common clock system. Time slot buffer 610 therefore stores the time slot count number which is passed via leads 618 to adder 604. At the same time, offset program logic array 607 provides an offset number in a manner described hereinafter. This offset number is provided via leads 617 to adder 604 and combined with the time slot number provided via leads 618 from buffer 610 to thereby provide an offset time slot number in advance of the time that the time slot actually occurs. The offset time slot number is to be used as the first address to be read out of RAM 600.

The offset time slot number produced by adder 604 is passed by way of leads 605 to register 603 and register 603, in turn, passes the offset time slot number by way of address leads 602 to the address inputs of RAM 600.

During each time slot, registers 616 provide a plurality of instructions to RAM 600. These instructions are generated by memory control logic 651 which follows the output of countdown circuit 652. Countdown circuit 652 is driven by the common clock and provides outputs to code converter 651 during the various phases of each time slot. For the initial phase portion of the time slot, code converter 651 passes instructions to registers 616 and the registers, in turn, provide instructions by way of control leads 615 to RAM 600 to read out a bus control entry (such as entry 1002) the specific bus control entry being designated by the offset time slot number being applied by registers 603 to address leads 602. Consequently, the previously described multiplexing factor and pointer number are read out of RAM 600 through leads 601 to memory bus 606. The multiplexing factor is then read into registers 612 and the pointer number is passed to registers 613.

The next address provided by adder 604 is derived from registers 613 and from offset program logic array 607. As previously noted, register 613 contains the pointer number and this pointer number is now passed via leads 618 to adder 604. At the same time, an offset number is provided by offset program logic array 607. This offset number is derived from a combination of a frame count number generated by frame counter 619 which is driven by timing signals from the common clock system together with the multiplexing factor derived from registers 612. This offset number differs from the previously described offset number in that registers 612 did not previously contain the multiplexing factor. In any event, the number now obtained from offset program logic array 607 is therefore a combination of the frame number and the multiplexing factor number and this combination is added to the pointer number from register 613 by adder 604. The output of adder 604 provides a RAM address to register 603 which is then passed by way of address leads 602 to RAM 600. At the same time, this combined number derived from adder 604 is fed to registers 635 for subsequent use as described hereinafter.

At this same time, a read instruction is passed by registers 616 through lead 615 to RAM 600. The consequent output of RAM 600 comprises the poll list entry 1001 which constitutes a frame driver number designating the frame driver which will provide the polling signal, the ICA (channel adapter) number which will enable the frame driver to apply the selection signal to the appropriate selection lead of the frame bus to select the channel adapter, the channel number (which will constitute the polling signal) and a channel type (which identifies the direction of data interchange), the channel number and channel type being subsequently combined to form the channel word which, as priorly noted, is forwarded by the frame driver to the frame bus during the first and second phases of the polling cycle. This information is passed by RAM 600 to bus 606 via leads 601 and registers 620, enabled by the common clock timing signals, reads the information off the bus and stores the information therein.

The information in registers 620 is read out by way of bus 621 into registers 622. This information will be passed on by driver 623 for distribution over the frame driver unidirectional bus 627 to the various frame drivers so that the frame driver designated by the frame driver number will select the appropriate channel adapter and pass the channel word to the selected channel adapter by way of the frame bus during the first and second phases of the polling cycle.

As previously discussed, an envelope of data is interchanged between the selected channel adapter and the frame common circuit over the frame bus during the third phase (and again during the fourth phase) of the polling cycle in a direction identified by the channel type information. Outgoing data to the frame bus is obtained via leads 630 from the DTR interface and passed to registers 631 and then by way of bus 621 to registers 622. The data in registers 622 is read out through driver 623 to frame driver bus 627 for distribution to the frame drivers, the designated frame driver being arranged to pass the data envelope on to the associated frame bus. Incoming data from the frame driver is received by transceiver 626 via frame driver bus 625 and passed to port registers 628. Registers 628, in turn, pass the data, by way of bus 621 (after parity is checked in parity circuit 632) to registers 633.

The cycle of operation for RAM 600 is again repeated in order to accommodate dual simplex operation. If the dual simplex mode is being provided, data envelopes are to be transmitted to and received from separate channel adapters during the polling cycle, a polling list entry being sent to the frame drivers, as previously described. The pointer number in registers 613 and a new offset number in offset program logic array 607 (derived from the frame number and the multiplex factor number) are again combined in adder 604 and passed to registers 603 to provide a new address input to RAM 600. A new frame driver number, channel adapter (ICA) number, channel number and channel type are derived from RAM 600 and passed to registers 620. This data is passed on to registers 624. At the same time, logic circuit 640 determines from the multiplex factor number, previously placed on bus 606 by RAM 600, whether the transmission mode of the frame buses is the dual simplex mode. If the frame buses are in the dual simplex mode, the new frame driver number, ICA number and the channel word are considered valid, an appropriate "valid" bit is added to the data in registers 624 and the register output is passed by transceiver 626 to bus 625 to designate the new frame driver, select the new channel adapter and send the new channel number to the frame bus. The Frame Controller is capable of simultaneously reading data from one portion and writing the other. Thus, during each of the last two phases of the time slot, a data envelope is passed from the DTR to the Frame Controller, while simultaneously, a data envelope from the new frame driver is obtained from bus 625 and placed in registers 628 for passage to register 633. The leads between Frame Controller 111 and Frame Driver 113 comprise two parts of a bus, such that one part can support data transfers from the controller to the driver while another part of the same bus supports transfer in the other direction. One frame driver thereby sends data to a channel adapter and simultaneously receives data from another channel adapter in each of the last two phases to provide a dual simplex function provided that the ICAs 102 or 104 are connected to the Frame Controller 111 through different Frame Drivers 113.

In the event that logic circuit 640 determines that the dual simplex mode is not valid, it passes the appropriate information to registers 624 and the control information in the registers will be ignored by the frame drivers.

Return now to the data received from the frame driver and now in registers 633. At this time, the RAM address previously stored in registers 635 by adder 604 is read out and passed back to adder 604. The consequent output of adder 604 on leads 605 is the same address which was priorly used to derive the frame driver number, the ICA number, the channel number and the channel type with the exception that the highest order bit of the address is modified. This slightly modified number, which is the address of a polling list buffer entry, such as Polling List Buffer Entry 1005, is passed to registers 603 and applied by address leads 602 to the address input of RAM 600. The write instruction is now applied by registers 616 through lead 615 to RAM 600. RAM 600, in response to the write instruction, obtains the data envelope in registers 633 via bus 606 and lead 600 and writes the data envelope in a memory location in RAM 600 which corresponds in part to, but differs by an order higher than, the memory location storing the control information for the channel, which control information includes the frame driver number.

The next major function performed in the frame controller is the time slot interchanging of data arriving from the channel adapters. This is described below.

If a time slot is not multiplexed among several channels, then the even and odd buffers 1003 and 1004, along with the TSI control list 1006 are required to implement the time slot interchange function. Recall that the data from the ICA have been stored in a polling list buffer storage area, the address of which corresponds to the address of a related polling list entry 1001, differing only in its high order bits. In each time frame, data from this polling list buffer is read back out via bus 606 into REGMM register 655. Then in each time frame, the even or the odd buffer is used to store the data from the channel adapters currently in REGMM register 655 (this data is stored in locations corresponding to the time slots in which the data was sent by the channel adapters) while the other (odd or even) buffer is read, one location per time slot, in the order specified by the time slot interchange control list. This data read out of the odd/even buffer is sent to the data timing recovery unit via output port 645. The input and output role of the even and odd buffers is changed after every time frame. This time slot interchanging operation in the frame controller results in a one time frame delay for data.

When time slots are multiplexed among several channels, the polling list buffer is used differently. In this case, data written to the polling list buffer are stored there for a number of time frames (specifically that number is one less than the number of ways the time slot is multiplexed) before being read out, whereas in the non-multiplexed case described above, the data was read out immediately after being written.

Figure 9:
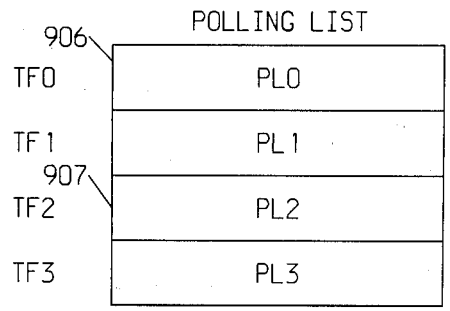
FIGS. 9, 10, 11, 12 an 3 in symbolic form the storage arrangements of memory circuits in the switching control circuitry.
Figure 10:
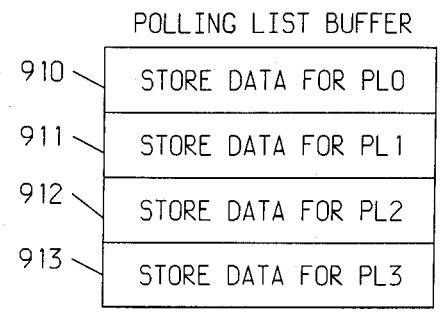

FIG. 9 discloses that portion of the polling list 1001 which is assigned to an arbitrary one of the time slots in every time frame. FIG. 10 discloses the area of polling list buffer 1005 for that time slot. These Figures are symbolically arranged for multiplexing four channels for the time slot, the polling information for the channels constituting the polling list entries designated as PL0, PL1, PL2 and PL3 in FIG. 9. The polling list entry that is being read out is controlled in part by the pointer number, symbolically shown in FIG. 9 by pointer 906, which pointer number is derived from registers 613 as previously described. An incremented pointer number (shown as pointer 907) that will be used during this time slot to read out the entry comprises a combination of the pointer number 906 and the offset number generated by program logic array 607, (which offset number as previously described, was obtained from the multiplexing factor and the frame number) which combination is generated by adder 604, as previously described. Since in this case there are four channels, the pointer number 907 will be generated during the time slot every fourth time frame and in the sequence vertically shown in FIG. 9.

Assuming now that a data envelope is received in this time slot, this incoming data envelope is then stored in the corresponding polling list buffer area 910, 911, 912, 913 (which are vertically aligned, for purposes of understanding, with the corresponding polling list entries PL0, PL1, PL2 and PL3).

Figure 12:
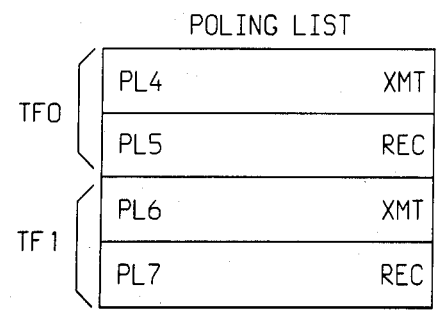

In the dual simplex case wherein the frame controller sends data through one frame driver to one frame bus and receives data from another frame bus during a common time slot, the frame controller must provide two polling words (one for each channel) during the time slot. The polling list arrangement for this dual simplex mode is shown in FIG. 12. The polling list word for the subchannel receiving the data follows the polling list word for the channel sending the data. FIG. 12 therefor symbolically shows the polling list words for two channels of a time slot, one channel symbolically shown as polling list words PL4 and PL5 and the other as polling list words PL6 and PL7 with channel words PL4 and PL6 corresponding to block receive subchannels and PL5 and PL7 corresponding to block receive subchannels.

Figure 13:
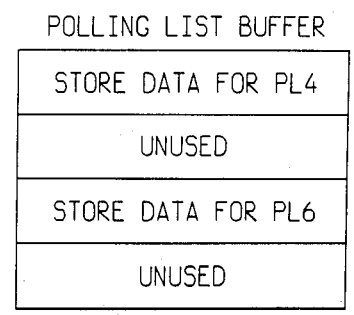

The polling list buffer area that will store the incoming data for the channels is shown in FIG. 13 aligned with the polling list word memory area, utilizing in this case buffer area corresponding to channels PL4 and PL6 to store the incoming data envelopes from the channel adapters.

Immediately following the storage of the word in the polling list buffer area, a word priorly stored in the polling list buffer area is read out to the odd/even buffer and stored in an area in the odd/even buffer corresponding to the time slot number of this polling list portion. As in the non-multiplexed case mentioned above, this transfer occurs via MMREG 655. The address for reading out the word is derived from register 635, which number is added to a new number generated by program logic array 607 and these numbers are added by adder 604 and passed by way of leads 605 to register 603 which, in turn, applies the new number to the address input of RAM 600 by way of leads 602. In the multiplex case for any subchannel other than the final subchannel (corresponding to polling list word PL3 in FIG. 9), program logic array 607 generates an offset number which increases the number derived from registers 635 by one. Thus, if the subchannel corresponding to channel word PL0 has just stored data in the polling list buffer, the priorly stored data from the subchannel associated with polling list word PL1 is now read out. This has the effect in each case to read out the data longest stored in the polling list buffer and, in the case of the four channel multiplexer mode, the word that had been stored there for three time frames. When the channel corresponding to polling list word PL3 is polled and the received data is stored, program logic array 607 generates an offset number which reduces the number in register 635 by three to provide an address word to RAM 600 that will read out the stored data derived from the channel corresponding to the polling list word PL0. Accordingly, each stored data envelope or envelopes will be read out to the odd/even buffer three time frames after is is stored. In the dual simplex case, program logic array 607 is arranged to increase or decrease the number in register 635 by two. The effect then is to alternately read out the data from the two buffers in the polling list buffer. It is apparent that other arrangements for multiplexing a different number of channels or for providing other channels for the dual simplex mode can readily be accommodated.

The data envelopes stored in the odd/even buffers are read out in an ordered arrangement defined by the time slot interchange control list 1006. The list is stored in RAM 600 and read out in sequence in accordance with the time slot numbers. As noted above, the time slot numbers are stored in register 610. During the appropriate phase of each time slot, an offset number is generated by ROM 608. The time slot numbers from register 610 and the offset numbers from ROM 608 are added by adder 604 for application by way of leads 605 and register 603 to address leads 602. The time slot number with an appropriate offset (to provide time for the subsequent functions) is thus applied to RAM 600 to enable RAM 600 to read out the time slot interchange control number from list 1006. This interchange number will point to a word in the odd/even buffer that is to be read out during the present time slot and consequently will have the effect of providing a time slot interchange. The read out time slot interchange number is passed through bus 606 to register 643. This time slot interchange number is now applied to adder 604 and a new address is thus passed to RAM 600, this new address corresponding to the odd/even buffer location that holds the data envelope which is to be presently read out. The read out data envelope is now passed through bus 606 and outgoing port 645 to leads 646 and on to the data timing recovery interface.

Memory Updating by Common Control Processor

As previously described, the updating of the RAM 600 memory in the frame controllers and the switch control 125 memory in the TDM switch is provided by the common control processor (ICC 103). More specifically, frame controller 111 of the "main" frame common circuit 106 (which constitutes the frame common circuit that terminates the frame bus 105 extending to ICA 104) periodically polls ICC 103 in "dedicated" channels and ICC 103, when appropriate, provides responses to the polling that update the above-mentioned memories to thereby change or update the switch connections.

In accordance with the present arrangement, the polling of ICC 103 occurs in time slots 123 and 125. Addressing information for the polling of ICC 103 is provided in the usual way; that is, the addressing information is generated by adder 604 and passed to register 603. The main frame common circuit 106 is provided with ROM 660 and the addressing information in register 603 during phases or portions of time slots 123 and 125 (and time slots 124 and 126) are passed to ROM 660 and the data stored therein is read out to lines 606. In the initial phase of time slots 123 and 125 (and time slots 124 and 126) ROM 660 provides the polling list entry to designate the appropriate frame driver, the appropriate ICA number to enable the frame driver to apply the selection signal to ICA 104 and, in addition, the channel number and channel type to form the channel word. This information derived from ROM 660 is passed to bus 606 and applied to register 620 as previously described. The information in register 620 is then read out by way of bus 621 to be passed on by driver 623 to thereby select the frame driver, enable ICA 104 and poll ICC 103.

As noted above, ICC 103 will be polled in time slots 123 and 125. Assuming that ICC 103 desires to provide a memory update it will transmit a pair of words, one in time slot 123 and the other in time slot 125 which will make up a command for some frame controller or for the time division switch. In general, certain bits in the first word of the command (that is the word in time slot 123) identify the "destination" as a frame controller or the time division switch. Subsequent bits of the first word indicate whether a memory read or write operation is desired (to provide memory update or to ascertain the present state of the memory) and remaining ones of the bits of the first word identify the memory address to be read (or written into). The second word of the command in time slot 125 contains the data to be written into the memory (assuming that this is a write command from ICC 103).

Returning now to main frame common circuit 106, each of the command words from ICC 103 is received by frame controller 111 in the main frame common circuit 106. As previously described, the word (or envelope of data) received in response to the polling is received by transceiver 626 in frame controller 111 in the conventional manner and then passed onto RAM 600. Each command word is then time slot interchanged (in this case as specified by ROM 660) so that the incoming command words in time slots 123 and 125 are returned to bus 606 in time slots 123 and 125 in the next time frame. Consequently, the words will then be passed by way of output port 645 to DTR 110 and then via fiber link 108 to TDM switch 107.

In the event that the command words are destined for TDM switch 107 and recalling that the words are being passed by way of time slots 123 and 125, these words are passed to switch control memory 125 and updating occurs as previously described. It is to be understood that this updating might change the switch interconnection for any time slot including the switch interconnection for time slots 123 and 125. In this manner, ICC 103 can instruct TDM switch 107 to provide switch interconnection for time slots 123 and 125 (and time slots 124 and 126) so as to connect the main frame common circuit to any frame common circuit including back to itself (the main frame common circuit) by way of the "privileged" channels which comprise these time slots.

Assuming now that ICC 103 has instructed TDM switch 107 to connect the main frame common circuit 106 to the destination frame common circuit via time slots 123 and 125 (and time slots 124 and 126) and further assume that the main frame common circuit has polled ICC 103 and ICC 103 has in turn responded by sending command words. These command words will now be passed through the main frame common circuit to TDM switch 107 and TDM switch 107, having established the appropriate connection to the destination frame common circuit then passes the command words to such destination frame common circuit in time slots 123 and 125. Each command word in the pair thus arrives at the destination frame common circuit and, more specifically, it is received by input port 631. The first command word, when passed to input port 631, is passed on to register 633 by way of bus 621. At the same time the address information bits in this first word are concurrently passed by way of bus 621 and leads 661 to register 609. The second command word, which contains the data, is also passed to register 633 when received by input port 631 during time slot 125.

If the first command word designates that this operation is a write operation, the data provided to register 633 is written into the memory address of RAM 600 which has previously been stored in register 609. The memory is thus updated to designate the new polling list entry and/or time slot interchange connection for the destination frame common circuit.

A response is provided to ICC 103 which consists of two words, the first word being identical to the first word of the command provided by ICC 103 and the second word consisting of data read out from memory. It is recalled that the first command word was written into register 633. This data is moved to RAM 600 and, more specifically, to the odd/even buffer location corresponding to time slot 124. The response word is time slot interchanged to time slot 124 in the next frame and then in the usual manner is passed to the time division switch 107 (which we have assumed has connected this frame common circuit with the main frame common circuit in time slot 124). The response word which corresponds to the command word is thus passed back to the main frame common circuit.

If ICC 103 has issued a command word which constitutes a memory read operation, the data in the memory address location of RAM 600 designated by register 609 is read out to register 620. The word is then passed by way of bus 621 to register 623 with appropriate parity bits being added by parity circuit 632 and control bit being added by logic circuit 640. The word thus formed is passed to register 633 and is thereafter written into the odd/even buffer location corresponding to time slot 126. This response word is then time slot interchanged to time slot 126 in the next frame and read out through register 620 and passed by way of the TDM switch 107 to the main frame common circuit. The frame controller 111 in the main frame common circuit polls ICA 104 in time slots 124 and 126 in the usual way using the polling list entry stored in ROM 660 and thus passes these command words back through register 622 and the frame driver 113 connected to frame bus 105 whereby the command words are ultimately delivered to ICC 103.

Physical Transfer of ICC 103

An advantage of the above-described arrangement is the ease that the common control processor ICC 103 can be physically moved to another location. It is contemplated that the common control functions might be assumed by another processor (CPU 100). In the event that such other processor comprises any CPU 100 which is connected (via the associated ICA 102 and from bus 101 or 105) to the "main" frame common circuit, the modification required comprises coding changes for ROM 660. More specifically, ROM 660 coding has to be changed to read out the new appropriate channel word for the new common control processor location during the time slots accommodating the "privileged" channels. In the event ROM 660 coding is used for the generation of the common control processor channel word during time slots accommodating "dedicated" channels, corresponding changes in the ROM 660 coding is required. In the event that such other processor (assuming the common control function) comprises any CPU 100 connected to a frame common circuit other than the "main" frame common circuit, modifications are required for the physical link to TDM switch 107 in addition to the above-described coding changes for ROM 660 (in both the "main" and other frame common circuits). More specifically, since the "main" frame common circuit is normally connected to a data timing recovery unit individual thereto in bank 120 (via fiber link 108) in order to pass switching information in the "privileged" channel to switch control 125, the fiber link connections require modifications to connect the "new" main frame common circuit to such individual data timing recovery unit in bank 120.

Although a specific embodiment of this invention has been shown and described, it will be understood that various modifications may be made without departing from the spirit of this invention.

What is claimed is:

1. In a multiple stage time division switching system wherein stages are interconnected by multichannel communication paths and certain stages are connected by way of other multichannel paths to a plurality of terminating circuits that exchange data with assigned channels on the paths connected thereto, each stage including interconnecting means responsive to switching data for interconnecting channels on paths to other channels on paths connected thereto whereby terminating circuits may communicate by way of channels interconnected by a plurality of the stages, a processor for generating and exchanging switching data, the processor being arranged to communicate by way of one of the terminating circuits so that the processor may be assigned to exchange switching data with at least a defined one of the channels on the communication path interconnecting the one terminating circuit and the certain stage connected thereto, and means for rendering said interconnecting means included in each stage responsive to the switching data on the defined channel.

2. In a multiple stage time division switching system in accordance with claim 1 wherein at least one stage includes means for applying switching data in a privileged channel on the multichannel path interconnecting the connected certain stage and the one stage to the switching data responsive means thereof and the connected certain stage is arranged to interconnect the defined channel and the privileged channel.

3. In a multiple stage time division switching system in accordance with claim 2 wherein other stages includes means for applying switching data in reserved channels on multichannel paths interconnecting the other stages and the one stage to the switching data responsive means thereof and the one stage is arranged to interconnect the privileged channel and the reserved channels.

4. In a multiple stage time division switching system in accordance with claim 3 wherein the one stage interconnects the privileged channel and the reserved channels in response to the switching data applied to the switching data responsive means thereof.

5. In a multiple stage time division switching system in accordance with claim 3 or 4 wherein the connected certain stage includes means for applying switching data in a reserved channel on the multichannel path interconnecting the one stage and the connected certain stage to the switching data responsive means thereof.

* * * * *